(No Model.)
C. S. BRADLEY.
SYSTEM OF DISTRIBUTION FOR POLYPHASE ALTERNATING CURRENTS.
No. 488,307. Patented Dec. 20, 1892.
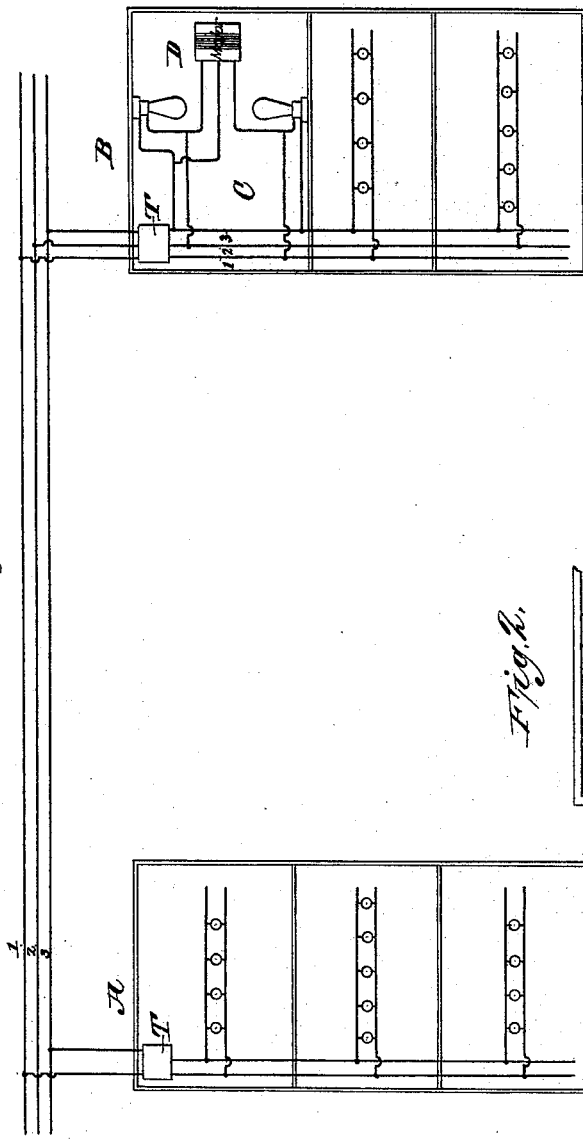
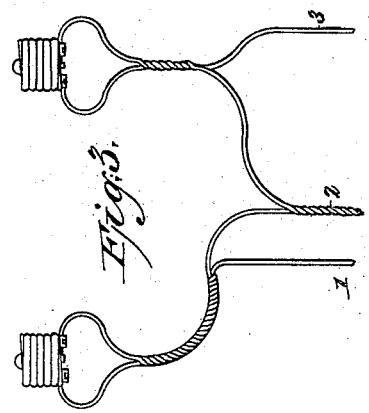
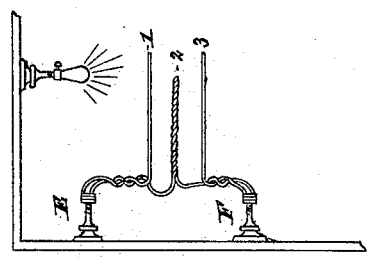
Attest,
C. W. Benjamin
E. C. Grigg.
Inventor;
Charles S. Bradley
by Read & Price
his attys

UNITED STATES PATENT OFFICE.

CHARLES S. BRADLEY, OF AVON, NEW YORK.

SYSTEM OF DISTRIBUTION FOR POLYPHASE ALTERNATING CURRENTS.

SPECIFICATION forming part of Letters Patent No. 488,307, dated December 20, 1892.

Application filed July 29, 1892. Serial No. 441,553. (No model.)

*To all whom it may concern:*

Be it known that I, CHARLES S. BRADLEY, a citizen of the United States, residing at Avon, in the county of Livingston and State of New York, have invented certain new and useful Improvements in Systems of Distribution for Polyphase Alternating Currents; and I do hereby declare the following to be a full, clear, and exact description of the invention, such as will enable others skilled in the art to which it appertains to make and use the same.

The object of this invention is to provide a system of wiring in a polyphase alternating current circuit so that in a local distributing plant, as a house, factory or shop, an economical use of wire may be made and motors or lamps may be supplied by the system. In systems of wiring as ordinarily designed for use in polyphase systems the lamp circuits and motor circuits are entirely distinct, but two of the mains being carried to a reduction transformer for lighting service, and a separate polyphase transformer being used for motor work. In such cases if it were desired to operate a motor in a building wired for lighting, the third wire not being present, a rotary current motor could not be used.

My invention permits of the use of a single transformer for both kinds of supply, the polyphase high tension currents being converted into polyphase currents of lower tension and the several leads being permutated in a plurality of lamp circuits and so arranged that the several wires of the polyphase system will lie within close or accessible range of each other so that they may be conveniently connected with the terminals of a polyphase motor.

My invention also admits of the present form of lamp sockets being used and of the supply of current to the polyphase motor therefrom.

The several features of novelty will be more fully hereinafter described and definitely indicated in the claims appended to this specification.

In the accompanying drawings which illustrate the invention, Figure 1 is a diagrammatic view showing the two plans of distribution above referred to; Fig. 2 is a detail view showing how under my plan of wiring a polyphase motor may be supplied from a lamp system; Fig. 3 shows a simple arrangement of ordinary plugs for lamp sockets for use in tapping the lamp circuits and supplying a polyphase motor.

In the drawings a three wire or triphase alternating system is illustrated, 1, 2 and 3 representing the several wires of such a system. It will however be understood that a polyphase system of any other order might be arranged upon the same principle. The reduction in tension by a transformer might as illustrated in Fig. 1 be made in the house, shop or factory to be lighted or the transformer might be arranged to supply a number of buildings in a manner well understood by electricians.

Referring first to the portion of Fig. 1 indicated by the letter A, but two of the supply wires feed into the lamp circuits, or if more than two of the wires are used the several circuits are led to distinct portions of the building or distributing plant. It is possible however to arrange the wires so that but little more copper will be required and yet at any point within the plant or building all of the wires of the polyphase system will be within easy access for motor connections. Such a system is diagrammatically illustrated at B in Fig. 1. As shown herein a local transformer is used for the system as indicated at T. The several wires of the polyphase system are led from this transformer and permutated among the several lamp circuits of the plant a pair of wires being used for each lamp circuit. In the system illustrated which is a triphase system any lamp circuit will render accessible at any point within that circuit two of the triphase wires. If therefore another lamp circuit one of the leads of which is the third wire of the polyphase system be brought within range of the first circuit at definite points the three wires will be accessible for making connections with and supplying a triphase motor or motors. It is only necessary therefore to arrange the lamp leads so that in any desired part of the building where use for motors may be found the three wires will be accessible. For example, the several lamps in the room or section of the building B marked C are connected in two circuits supplied by the three wires of the triphase system. A rotary current motor D therefore may be operated in this section by making three points of connection with the lamp circuits as indicated establishing connections with the wires 1, 2, 3 of the triphase system. The circuits are preferably so led that two or more lamp brackets in the same room will have connection with the several wires of the polyphase system. For example, as shown in Fig. 2, the bracket E would connect with two of the wires and the bracket F would include the third wire, so that if two sockets connected to plugs such as indicated in Fig. 3 were connected with the lamp sockets mounted on the brackets E, F, the wires 1, 2, 3, would be supplied with three currents differing in phase 120° and a rotary current motor might be connected directly therewith. It is not of course absolutely necessary that the several brackets necessary to supply the motor should be in the same room. Such an example is shown simply for purpose of illustration. It is only necessary that the three triphase wires shall lie within convenient range of each other. Where a three wire direct current system is already installed the adoption of my invention becomes a matter of great simplicity, it being only necessary to make the necessary connections at the transformer so as to deliver on the three leads the three alternating currents and to connect the plugs through which the motors are to be supplied with two lamp sockets connecting with the three leads. A simple test to insure a proper connection between the plugs and sockets so that the wires 1, 2, 3 leading from the plugs will deliver currents differing in phase one hundred and twenty degrees is by connecting an incandescent lamp across the four socket terminals successively. The pair which fails to render the lamp incandescent are of the same potential and are to be connected together as indicated at 2 in Fig. 3. The lamp placed between any of the other terminals, as 1 and 2, 2 and 3, or 1 and 3, will glow. In some cases a three point socket might be permanently fixed at any point desired so that a co-operating plug provided with three contact points could be used for establishing the motor connection. In either case the grouping of the lamp leads permits a motor circuit to be directly established at any point of the plant without running such circuit through the entire building from the transformer. It will of course be understood that other translating devices than motors might be used in cases where such devices require polyphase currents for their most successful operation.

By "polyphase motors" herein referred to is meant motors operating by differential phase alternating currents, and by "polyphase system" a system utilizing two or more alternating currents of differential phase, the term "polyphase" being often used in the art to signify generically a differential phase system of any order.

Having thus described my invention what I claim as new and desire to secure by Letters Patent is:—

1. A system of local distribution for polyphase alternating currents having the several wires distributed in pairs among a number of lamp circuits, two or more adjacent circuits including all wires of the polyphase system and motor circuits connected with the wires of the several lamp circuits so as to include all of the polyphase currents in the motor system.

2. The combination with a polyphase alternating current circuit of two or more lamp circuits connected in pairs with all of the polyphase wires, the lamp leads being distributed so that the several wires of the polyphase system will lie in near relation to each other, whereby a polyphase motor may be readily supplied.

3. The combination with a triphase alternating current circuit of two or more lamp circuits including the several wires of the polyphase systems in pairs, the lamp leads being distributed so that three wires differing in phase will be readily accessible from a point or points, whereby triphase motors may be supplied by the system.

4. The combination with a triphase alternating current circuit of two or more lamp circuits including the several wires of the polyphase systems in pairs, the lamp brackets or sockets being so distributed that the three third-phase wires will be accessible from one or more points, and polyphase motors having their terminals connected with the triphase circuits at two or more sockets as described.

5. The combination with a triphase alternating current circuit of two or more lamp circuits including the several wires of the polyphase system in pairs, said lamp circuits being so distributed that two embracing the three leads of the system will lie in the same neighborhood at points where motor service is wanted, and motor leads connected at said points with the three wires.

In testimony whereof I affix my signature in presence of two witnesses.

CHARLES S. BRADLEY.

Witnesses:
JOSEPH C. SPAETH,
CHAS. W. PRICE.